Nov. 30, 1948.  F. RIEBER  2,455,021

PRESSURE METER

Filed Jan. 29, 1944

INVENTOR.
FRANK RIEBER
BY

Patented Nov. 30, 1948

2,455,021

UNITED STATES PATENT OFFICE 2,455,021

PRESSURE METER

Frank Rieber, New York, N. Y., assignor to Interval Instruments, Inc., New York, N. Y., a corporation of New York Application January 29, 1944, Serial No. 520,200

7 Claims. (Cl. 250—36)

This invention relates to a pressure gauge which responds to changes in pressure by creating changes in the frequency of an alternating current which accurately correspond thereto. It is an object of this invention to provide a gauge which will be free from many of the inaccuracies of the former gauges, and which will enable pressures to be determined with a high degree of accuracy and reliability.

It is a further object to provide a system in which the pressure responsive elements may be made very small, but which nevertheless may be caused by amplification to furnish any amount of power desired for indication, recording or controlling purposes, with no errors introduced into the system by such amplification.

It is a further object to provide a system in which the pressure responsive mechanism may be placed at one point and the indications may be at a very distant point, even disconnected electrically therefrom, but which nevertheless will give just as accurate readings as though they were directly and immediately connected.

In my copending application for oscillating systems filed of even date herewith and bearing Serial No. 520,197, now abandoned, I have disclosed an oscillating system in which the frequency of oscillation is determined by the frequency of a vibrating member. In that system the frequency is taken from the vibrating member by an electrode spaced from the member, which is connected to an amplifying system responsive to the changes in capacity between the vibrating member and the electrode. That system is unusually sensitive to frequency and free from extraneous influences.

In the present invention a similar principle is employed to measure pressures by utilizing a pressure responsive element to change the tension on the vibrating wire, and hence to change its frequency as a predeterminable function of the pressure.

The invention accordingly comprises a device possessing the features, properties and the relation of elements which will be exemplified in the article hereinafter described and the scope of the application of which will be indicated in the claims.

For a fuller understanding of the nature and objects of the invention, reference should be had to the following detailed description, taken in connection with the accompanying drawings, in which.

Figure 1:
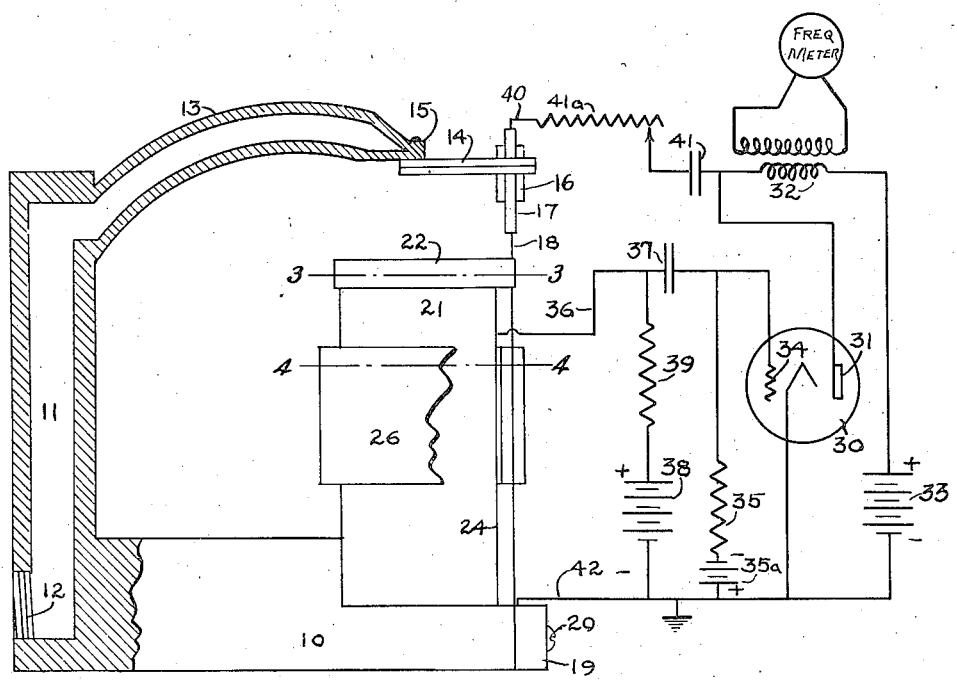
Fig. 1 is a section through a device embodying the pressure sensitive device connected to an oscillating system which, while conventionally shown, forms generally a part of this invention.
Figure 2:
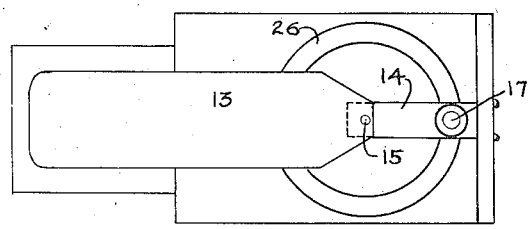
Fig. 2 is a plan view of the pressure sensitive device.
Figure 3:
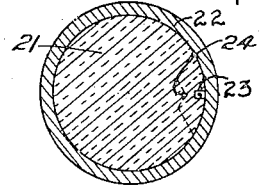
Fig. 3 is a section on the line 3—3 of Fig. 1.
Figure 4:
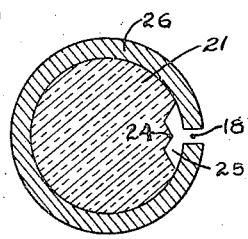
Fig. 4 is a section on the line 4—4 of Fig. 1.

Within the scope of this invention, any form of pressure sensitive device may be employed which will alter the tension of the wire as a known function of the pressure, and in my copending application for a telegauge filed of even date herewith and bearing Serial No. 520,199, Patent No. 2,447,817, dated August 24, 1948, I have shown one form of such apparatus embodying a chamber defined on one side by a flexible diaphragm.

In the embodiment herein disclosed, I have chosen for illustration a flat curved tube commonly referred to as a Bourdon tube, which, as is well known, when subjected to internal pressure, tends to straighten out. Such tubes are commonly used in pressure gauges, being geared to an indicating hand or the like, so that the actual movement of the tip of the tube moves the indicating hand. Such instruments have proved of value in commercial measurements, but they possess serious limitations; first, because the actual movement of the end of the tube in response to pressure is not a straight line function of the pressure because the actual bending of the tube changes the strains within it which resist the motion. Second, the actual molecular movements within the tube are such that the movement does not at all times accurately correspond to the pressures imposed. For example, if the pressure be approached from an upper limit, a different reading will be obtained than if the same pressure is approached from a lower limit. Moreover, since the actual movement of the tube is used to move the indicating hands, it requires a large tube and a magnifying gear train, and the gear train introduces inaccuracies, friction and lost motion, and the instrument itself cannot be made as compact as it is desired for many purposes.

It is an object of this invention, therefore, to employ a Bourdon tube in such a manner that its inherent qualities may be utilized free from limitations to which we have referred. This is accomplished generally by constraining the tube against movement by the strains upon the vibrating wire, and to measure the pressure, not by the movement of the tube, but by the force that it imposes upon the wire without substantial movement.

To secure accuracy of response of such a wire, it is essential that the wire vibrate at one frequency only, whether it be the fundamental or a single harmonic, since other vibrations alter the frequency by imposing increased tension on the wire. We have here selected for illustration the vibration of the wire at its fundamental frequency, and for this purpose it is important that the motor force act upon a considerable portion of the wire, at least, preferably more than a third, to prevent stimulation of the third and higher harmonics, and this motor force should be symmetrically disposed to prevent the introduction of undesired harmonics. If a higher harmonic be selected, the same principles will obtain if we consider the unit portion of the wire between nodes as the wire.

It is also important that the motor force acting upon the wire shall be substantially uniform and shall be exerted at the same point in the movement of the wire at each successive impulse, since otherwise variations in amplitude will occur with resultant changes in frequency because the greater the amplitude, the more tension on the wire and hence the higher the frequency.

A further important factor is that the take-off, that is, the mechanism by which the vibration reacts on the oscillator system to determine its frequency, shall be such as to respond only to the chosen harmonic, which in general means that it shall respond to the vibration of the desired unit of the wire as a whole, and in so far as possible cancel out vibrations at multiple or fractional frequencies. That is if the fundamental be the chosen frequency, the take-off should be such as to cancel out response to multiple frequencies. This can be accomplished by making the take-off extend symmetrically through substantially the entire length of the wire so that vibrating fractions will in so far as possible neutralize each other in their effect on the oscillating system.

It is also important that the motor force shall be symmetrical transverse to the direction of motion, since a motor force which acts non-uniformly encourages undesired harmonics.

In the drawings, the numeral 10 designates a base having within it a chamber 11, having a connection at 12 for the source of the pressure to be measured and supporting a Bourdon tube 13, which, as is well known, generally comprises a flattened tube curved in the plane of its minimum diameter.

Means may be provided if desired to compensate for temperature changes, and as illustrated this is shown in the form of a bimetallic strip 14 which is fastened at 15 to the free end of the Bourdon tube, and which itself carries an insulator 16, within which is mounted a pin 17, to which the end of the wire 18 is attached. The other end of the wire 18 is clamped to the base 10 by means of a small plate 19 held in place by screws 20. The initial tension of the wire 18 may be determined in originally calibrating the instrument by applying the desired strain upon the wire before the block 19 is screwed into place, and the length and characteristics of the bimetallic strip will be so chosen that for all temperature changes within which the instrument is to be employed, there will be no variation in the tension on the wire 18, so long as there is no change in the pressure within the chamber 11.

The free end of a Burdon tube tends to move along a curve, and by proper positioning of the base and angle of the tube, this curve may be made tangent to a vertical line, so that the strains imposed by the tube on the wire 18 will be in alignment with the wire. Thus there are no lateral pressures imposed on the wire.

Mounted upon the base 10 is an insulator 21 carrying at its top a cap 22 having a slot 23 to receive the wire 18 and to define its position, this slot being of such shape that the wire will at all times rest in its bottom. The insulator 21 is provided with an elongated electrode 24 parallel to and closely adjacent to the wire 18. One desirable method of supporting this electrode is to provide within the insulator a pair of adjacent grooves 25 separated by a ridge on the apex of which the electrode 24 is supported. This electrode may conveniently be imbedded within the insulator, but it preferably has its outer face free from insulation. Means are provided for establishing a magnetic field transverse to the plane of the wire 18 and electrode 24 and centrally spaced about the wire. This is shown in the form of a C-shaped magnet 26 which encircles the insulator and has its poles on opposite sides of the wire 18.

The apparatus just described is connected to an oscillating system in such a manner that current is fed through the wire 18 by the system and that the frequency of the system is determined by variations in the capacity between the wire 24 and the wire 18 during the vibrations of the latter. In Fig. 1 we are shown a conventionalized oscillating system for this purpose, in which the numeral 30 denotes an electron tube, the plate 31 of which is connected in series with the primary winding of a transformer 32 and a battery 33, and the grid 34 of which is connected to ground through a grid leak 35 and a sufficient grid bias battery 35a.

This tube is connected to the pressure sensitive device as follows: A lead 36 leads from the electrode 24 through a blocking condenser 37 to the grid 34, and a battery 38 acting through a higher resistance 39 imposes a potential upon the electrode 24. The pin 17 is connected through a wire 40 and a feed back control resistor 40a and a condenser 41 to the plate 31, and the base of the instrument, which is the lower end of the wire 18, is connected by wire 42 with the ground.

With the foregoing connection, the charge upon the electrode 24 varies with the capacity between that electrode and the wire 18, and this variation in charge is reflected through the condenser 37 to the grid 34 of the tube 30. The plate 31, furnishing alternating current to the wire 18 through the condenser 41, maintains the vibration of the wire 18 transverse to the field of force, that is, toward and from the electrode 24, and this is in precisely the direction to set up and maintain the oscillation within the oscillator.

It is intended that this apparatus be used with a frequency measuring device which is indicated in the drawings.

Since the pressure bears fixed relation to the frequency, obviously any accurate frequency meter may be used, but I prefer to use the one shown in my copending application Serial No. 520,196 for a transducer, since the sensitiveness of the gauge depends also upon the sensitiveness in the reading of the frequency produced. It will be understood, however, that the frequency meter will be calibrated to read in pressure, rather than in cycles, to avoid the necessity of conversion.

By reason of the fact that the frequency is taken from the wire by electrostatic means, and not electromagnetically, there is no tendency of this takeup to vary the frequency of the wire, and by reason of the fact that the wire vibrates transverse to the field, the magnetic force which is exerted upon it is constant. As a result, the forces tending to create a vibration are at all times proportional to the current furnished by the amplifying system. Thus the period of amplification is not altered by the changes in voltage.

Moreover, by reason of the fact that there is no magnetic or electrical force tending to dampen the wire, it may be made extremely sensitive so that pressure readings may be made with extreme accuracy. Thus with the wire vibrating at a frequency from one to three thousand vibrations per second, I have succeeded in limiting the response of the wire to the exact frequency corresponding to the tension plus or minus five cycles per second, and this can be very much reduced if desired by operating the device in a vacuum.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. A device of the character described, comprising a wire, means for supporting one end of said wire, a pressure responsive element connected to the other end of said wire for maintaining said wire under tension, an electrode parallel to and spaced from said wire and insulated therefrom of substantially the same length as the wire, a temperature responsive element connected at one end of said wire for correcting temperature variations in the device, and a terminal connected to said electrode.

2. A device of the character described, comprising a wire, a support for one end of said wire, a Bourdon tube having a free end connected to the other end of said wire, whereby said tube is constrained from movement by said wire and varies the tension on said wire in accordance with pressure variations, a linear electrode of substantially the same length as the wire, means for supporting said electrode parallel to and closely adjacent to said wire, but insulated therefrom, and a terminal connected to said electrode.

3. A device of the character described, comprising a wire, a support for one end of said wire, a Bourdon tube having a free end connected to the other end of said wire, whereby said tube is constrained from movement by said wire and varies the tension on said wire in accordance with pressure of variations, a linear electrode of substantially the same length as the wire, means for supporting said electrode parallel to and closely adjacent to said wire, but insulated therefrom a terminal connected to said electrode, and means symmetrically placed with regard to said wire for establishing lines of magnetic force transverse to the plane defined by said wire and said electrode.

4. In a telegauge, in combination, a Bourdon tube subjected to pressure variations, a magnet, a wire connected to said Bourdon tube and extending transverse to the field of said magnet, a support for the other end of said wire, said magnet extending for a length along the wire substantially more than one third the length of the wire and centrally disposed with regard to said wire, an oscillator, means responsive to vibrations of said wire transverse to said field for controlling the frequency of said oscillator, and means operated by said oscillator for passing alternating current through said wire of the oscillator frequency.

5. In a telegauge, in combination, a Bourdon tube subjected to pressure variations, a magnet, a wire attached to said Bourdon tube and stretched transverse to the field of said magnet, a support for the other end of said wire, said magnet extending for a length along the wire substantially more than one-third the length of the wire and centrally disposed with regard to said wire, an oscillator, means including an electrode parallel to said wire and in the plane of vibration thereof, connected to said oscillator to determine the frequency thereof by the changes in capacity between said electrode and said wire, and means for connecting said wire to said oscillator to cause it to be vibrated.

6. In a telegauge adapted for use with an oscillator and frequency meter to indicate pressure, in combination, a base, a Bourdon pressure tube supported by said base with a free end movable in a direction toward and from said base, a wire stretched in said direction between said free end of said gauge and said base, and terminals connected with the ends of said wire.

7. In a telegauge adapted for use with an oscillator and frequency meter to indicate pressure, in combination, a base, a Bourdon pressure tube supported by said base with a free end movable in a direction toward and from said base, a wire stretched in said direction between said free end of said gauge and said base, terminals connected with the ends of said wire, and a magnet supported by said base in position to establish a magnetic field transverse to said wire.

FRANK RIEBER.

REFERENCES CITED

The following references are of record in the file of this patent:

UNITED STATES PATENTS

| Number | Name | Date |
|---|---|---|
| 1,032,384 | Dixon | July 16, 1912 |
| 1,638,993 | Hartley | Aug. 16, 1927 |
| 1,878,109 | Clark | Sept. 20, 1932 |
| 1,995,305 | Hayes | Mar. 26, 1935 |
| 2,027,074 | Miessner | Jan. 7, 1936 |
| 2,050,674 | Stover | Aug. 11, 1936 |
| 2,220,350 | Purington | Nov. 5, 1940 |
| 2,236,985 | Bartelink | Apr. 1, 1941 |
| 2,265,011 | Siegel | Dec. 2, 1941 |
| 2,266,114 | Bartlett | Dec. 16, 1941 |
| 2,302,895 | Root | Nov. 24, 1942 |
| 2,318,936 | Fisher | May 11, 1943 |
| 2,377,869 | Elliott | June 12, 1945 |

FOREIGN PATENTS

| Number | Country | Date |
|---|---|---|
| 155,854 | Great Britain | 1921 |
| 622,581 | Germany | Dec. 2, 1935 |